United States Patent [19]

Demou et al.

[11] 4,347,330
[45] Aug. 31, 1982

[54] LOW-COST SURFACTANT COMPOSITIONS FOR HIGH RESILIENCY FLEXIBLE FOAMS

[75] Inventors: John G. Demou, Lincoln Park; Edward R. Pray, Dearborn; Robert L. McBrayer, Lincoln Park, all of Mich.

[73] Assignee: BASF Wyandotte Corporation, Wyandotte, Mich.

[21] Appl. No.: 300,048

[22] Filed: Sep. 8, 1981

[51] Int. Cl.$^3$ .............................................. C08G 18/14
[52] U.S. Cl. ..................................... 521/110; 521/112
[58] Field of Search ................................ 521/110, 112

[56] References Cited

U.S. PATENT DOCUMENTS

| | | | |
|---|---|---|---|
| 3,050,477 | 8/1962 | Gmitter et al. | 521/110 |
| 3,669,913 | 6/1972 | Morehouse | 521/112 |
| 3,920,587 | 11/1975 | Watkinson | 521/111 |
| 3,931,066 | 1/1976 | Puig et al. | 521/110 |
| 4,081,410 | 3/1978 | Moeller | 521/112 |
| 4,139,503 | 2/1979 | Kollmeier et al. | 521/112 |
| 4,147,847 | 4/1979 | Schweiger | 521/112 |
| 4,163,830 | 8/1979 | Windemuth et al. | 521/111 |

*Primary Examiner*—Maurice J. Welsh
*Attorney, Agent, or Firm*—Bernhard R. Swick

[57] ABSTRACT

The method for improving cell structure with little or no shrinkage or foam collapse in molded high resilience open celled flexible polyurethane foams prepared by the reaction of an organic polyol having a hydroxyl functionality of at least 2 with an organic polyisocyanate in the presence of a blowing agent. This method comprises incorporating with the reactants three cell modifiers consisting of a polysiloxane-polyoxyalkylene copolymer, a polymethylsiloxane, and a polyether polyol cell modifier containing polyoxyethylene groups in amount of at least about 80 percent by weight of said polyether polyol.

14 Claims, No Drawings

LOW-COST SURFACTANT COMPOSITIONS FOR HIGH RESILIENCY FLEXIBLE FOAMS

BACKGROUND OF THE INVENTION

1. Field of the Invention

The present invention pertains to flexible polyurethane foam compositions and methods for the preparation thereof. More particularly, the present invention relates to high resilience, open-celled, flexible polyurethane foam compositions characterized by fine uniform cell structure and little or no shrinkage or foam collapse.

2. Description of the Prior Art

Polyurethane foams are formed by reacting a polyisocyanate with a polyol which may be a polyether containing hydroxyl groups or a polyester containing hydroxyl groups in the presence of a blowing agent, a catalyst and a surfactant. The blowing agent may be $CO_2$ generated by a water isocyanate reaction. Other blowing agents include methylene chloride and fluorocarbons whereby heat generated when the polyisocyanate reacts with the polyol evaporates the blowing agent so it passes through the liquid mixture forming bubbles therein. If a surfactant is not used in the foaming composition of a high resiliency flexible foam, the bubbles simply pass through the liquid mixture without forming a foam.

In the past, many surfactants were used to form a foam from the liquid mixture, as well as to control the size of the bubbles of the foam so that a foam of a desired structure was obtained. Preferably, a foam with small bubbles or cells therein of uniform size is desired in that it has the most desirable physical properties such as tensile strength, elongation and tear as well as improved comfort characteristics. Also, it is desirable to have a foam with open cells which does not collapse prior to forming a strong gel or curing. In the past, it was discovered that polysiloxanes having oxyalkylene units in the polymer chain were useful as surfactants in foaming polyurethane. However, these polysiloxanes are expensive and a need has been developed for an inexpensive substitute for these conventional commercially-available silicone surfactants which are commonly used as cell stabilizers in high resiliency molded flexible urethane foams. Accordingly, in accordance with the prior art, a dimethylsiloxane has been used alone in various formulations and particularly those which contain graft polyol and tin catalyst. This has been found to give desirable fine open cells at the surface of the foam where it contacts the mold, however, insufficient stability within the interior of the foam can result in foam collapse. The addition of very small amounts of highly efficient polysiloxane-polyoxyalkylene surfactants along with dimethylsiloxane stabilize the cells so effectively that they do not open when the foaming reaction is complete and shrinkage occurs.

Accordingly, it is the purpose of the instant invention to provide high resiliency, molded, open celled flexible polyurethane foam compositions characterized by small bubbles or cells of fine uniform size which are open and do not collapse prior to forming a strong gel on curing.

References

| U.S. Pat. No. | Issued | Inventor | Assignee |
| --- | --- | --- | --- |
| 4,139,503 | 2/13/79 | Kollmeier et al | Th. Goldschmidt AG |
| 3,669,913 | 6/13/72 | Morehouse | Union Carbide |
| 3,920,587 | 11/18/75 | Watkinson | Union Carbide |
| 4,163,830 | 8/7/79 | Windemuth et al | Bayer |
| 3,050,477 | 8/21/62 | Gmitter et al | General Tire |
| 4,147,847 | 4/3/79 | Schweiger | Dow Corning |
| 4,081,410 | 3/28/78 | Moeller | General Electric |

U.S. Pat. No. 4,139,503 is directed to a process for production of high resilience open-celled polyurethane foams which do not shrink in storage wherein from 0.01 to 2.0 grams per 100 grams of polyol of specific siloxane components are added to the foaming charge. The siloxane components are selected from the group consisting of straight-chain or branched organopolysiloxanes and polyoxyalkylene-polysiloxane block copolymers. An example of the polysiloxanes which may be employed is polydimethyl siloxane.

U.S. Pat. No. 3,669,913 discloses a solution composition particularly useful for the manufacture of flexible polyether urethane foam which includes a hydrolytically stable siloxane-oxyalkylene block copolymer along with a water-soluble silicon-free organic surfactant. Suitable organic surfactants include ethylene oxide adducts of nonylphenol which contain as high as 20 ethylene oxide groups. This patent also discloses that polyether polyols suitable for the production of polyurethane foams are graft polymer polyether compositions obtained by polymerizing ethylenically unsaturated monomers in a polyether.

U.S. Pat. No. 3,920,587 discloses a process for production of open-cell rigid polyether polyurethane foam employing as the cell opening agent a siloxane-oxyalkylene block copolymer. This patent also discloses the inclusion as other conventional additives, diol foaming modifiers, for example, ethylene glycol, polyethylene glycol and the like.

U.S. Pat. No. 4,163,830 discloses the use of polysiloxane-polyoxyalkylene copolymers as stabilizers in the production of polyurethane foam plastics. Further, the patent states that the relatively high viscosity of the stabilizers used in accordance with the invention is often a disadvantage. Accordingly, the end products of the process are preferably used in solution in solvents and preferred solvents are polyethers which can contain as high as 100 oxyethylene groups. Further, the example shows a stabilizer which has its viscosity reduced simply by mixing the stabilizer with a 1,3-propylene glycol initiated polyether, in which propylene oxide and ethylene oxide in a mixing ratio of 50:50 have been polyadded in the presence of catalytic quantities of sodium alcoholate.

U.S. Pat. No. 3,050,477 relates to a method of making polyurethane foam using an organic silane stabilizer which may use a diol modifier to improve the foaming action. Among the listed examples of such modifiers are polyethylene glycol with an average molecular weight of 1000 and polyethylene glycol with an average molecular wight of 1500.

U.S. Pat. Nos. 4,147,847 and 4,081,410 both disclose siloxane-oxyalkylene copolymers as foam stabilizers in flexible foams.

SUMMARY OF THE INVENTION

The present invention is directed to molded, high-resilience, open celled flexible polyurethane foam compositions characterized by fine uniform cell structure with little or no shrinkage and no foam collapse. These are prepared by the reaction of an organic polyisocyanate with an organic polyol in the presence of three specified cell modifier components. These cell modifiers are polysiloxane-polyoxyalkylene copolymer, polymethyl siloxane, and polyether polyol containing polyoxyethylene groups in amount of at least 80 percent by weight of the polyether. As used herein, the expression polymethyl siloxane includes polyphenylmethyl siloxanes. The weight percentage of each type of cell modifier component based on the total weight of all three modifiers is 0.5 to 15 percent polysiloxane-polyoxyalkylene copolymer; 0.5 to 15 percent polymethylsiloxane and 70 to 99 percent by weight of the ethylene oxide containing polyether polyol cell modifier. The total amount of the three cell modifier components is about 0.2 to 10 percent by weight of the polyurethane foam forming composition.

DESCRIPTION OF THE PREFERRED EMBODIMENT

An example of a high-molecular-weight polysiloxane-oxyalkylene copolymer (hereinafter called siloxane-oxyalkylene copolymer A) is a hydrolyzable siloxane-oxyalkylene copolymer (hereinafter called siloxane-oxyalkylene copolymer A-I) expressed by the general formula (I)

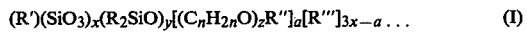

$$(R')(SiO_3)_x(R_2SiO)_y[(C_nH_{2n}O)_zR'']_a[R''']_{3x-a} \ldots \quad (I)$$

wherein x is an integer of at least 1 and stands for the number of trifunctional silicon atoms; y is an integer of at least 3 and stands for the number of difunctional siloxane units; z is an integer of at least 5 and stands for the length of a polyoxyalkylene chain; a is an integer and stands for the number of polyoxyalkylene units; n is an integer of 2 to 4 and stands for the number of carbon atoms in an oxyalkylene group; R is a monovalent hydrocarbon group, e.g., alkyl or aralkyl; R' is an x-valent hydrocarbon group, e.g., when x is 1, a monovalent hydrocarbon group such as alkyl, when x is 2, a divalent hydrocarbon group such as alkylene, when x is 3, a trivalent hydrocarbon group and when x is 4, a tetravalent hydrocarbon group; R'' is a monovalent hydrocarbon group, e.g., alkyl or aralkyl, forming a monoether group at the end of an alkylene chain; and R''' is an alkyl group or trihydrocarbylsilyl group at an end of a siloxane group, characterized by containing 10 to 80 percent by weight of polysiloxane units and 90 to 20 percent by weight of polyoxyalkylene units, having polysiloxane chains and polyoxyalkylene chains bonded with a C-O-Si bond and having a molecular weight of 1,000 to 16,000.

Alternatively, as siloxane-oxyalkylene copolymer A in the present invention can also be used a non-hydrolyzable siloxane-oxyalkylene copolymer (hereinafter called siloxane-oxyalkylene copolymer A-II) expressed by the general formula (II)

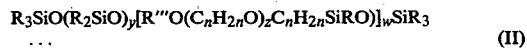

$$R_3SiO(R_2SiO)_y[R'''O(C_nH_{2n}O)_zC_nH_{2n}SiRO)]_wSiR_3 \ldots \quad (II)$$

wherein w is an integer of at least 1 and y, z, n, R and R''' are the same as defined in the above formula (I), characterized by containing 5 to 95 percent by weight, preferably 5 to 50 percent by weight of polysiloxane units and 95 to 5 percent by weight, preferably 95 to 50 percent by weight of polyoxyalkylene units, having a polysiloxane chain and a polyoxyalkylene chain bonded with a C-Si bond (instead of a C-O-Si bond) and having a molecular weight of 1,000 to 16,000.

As an example of a low-molecular-weight siloxane-oxyalkylene copolymer (hereinafter called siloxane-oxyalkylene copolymer B) there can be mentioned a hydrolyzable siloxane-oxyalkylene copolymer (hereinafter called siloxane-oxyalkyelne copolymer B-I) expressed by the general formula (III)

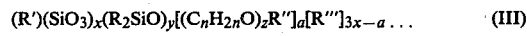

$$(R')(SiO_3)_x(R_2SiO)_y[(C_nH_{2n}O)_zR'']_a[R''']_{3x-a} \ldots \quad (III)$$

where x is an integer of at least 1 and stands for the number of trifunctional silicon atoms; y is an integer of at least 3 and stands for the number of difunctional siloxane units; z is an integer of 0 or 1 to 4 and stands for the length of a polyoxyalkylene chain; a is an integer and stands for the number of polyoxyalkylene units; n is an integer of 2 to 4 and stands for the number of carbon atoms in an oxyalkylene group; R is a monovalent hydrocarbon group such as alkyl, aryl or aralkyl; R' is an x-valent hydrocarbon group, e.g., when x is 1, a monovalent hydrocarbon group such as alkyl and when x is 2, a divalent hydrocarbon group such as alkylene; R'' is a monovalent hydrocarbon group such as alkyl, aryl or aralkyl and forms a monoether group at the end of a polyoxyalkylene chain; and R''' is an alkyl group or trihydrocarbylsilyl group at an end of a siloxane group, characterized by containing more than 80 percent by weight of polysiloxane units and less than 20 percent by weight of polyoxyalkylene units, having a polysiloxane chain and a polyoxyalkylene chain bonded with a C-O-Si bond and having a molecular weight of 500 to 10,000.

Alternatively, as siloxane-oxyalkylene copolymer B in the present invention can also be used a non-hydrolyzable siloxane-oxyalkylene copolymer (hereinafter called siloxane-oxyalkylene copolymer B-II) expressed by the general formula (IV)

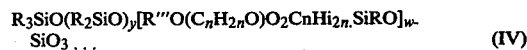

$$R_3SiO(R_2SiO)_y[R'''O(C_nH_{2n}O)O_2C_nHi_{2n}SiRO]_w\text{-}SiO_3 \ldots \quad (IV)$$

where w is an integer of at least 1, y, z, n, R and R''' are the same as defined in the above formula (III), characterized by containing more than 95 percent by weight of polysiloxane units and less than 5 percent by weight of polyoxyalkylene units, having a polysiloxane chain and a polyoxyalkylene chain bonded with a C-Si bond (instead of a C-O-Si bond) and having a molecular weight of 500 to 10,000. The above polysiloxane-polyoxyalkylene copolymers are described in U.S. Pat. No. 4,119,582.

The siloxane-oxyalkylene copolymer may be prepared by reacting a monoalkylene ether, preferably the allyl ether, of the desired polyoxyalkylene glycol with a siloxane containing SiH group.

The reaction is carried out by heating a mixture of the two reactants in the presence of a platinum catalyst such as chloroplatinic acid dissolved in a small amount of isopropyl alcohol, at temperatures from 100° to 200° C.

The siloxanes can be of four formulae:

$$R_aSi[(OSiMe_2)_n(OSiMeH)_dOSiMe_2H]_{4-a} \quad (1)$$

$$HMe_2Si(OSiMe_2)_n(OSiMeH)_bOSiMe_2H \quad (2)$$

$$Me_3Si(OSiMe_2)_n(OSiMeH)_cOSiMe_3 \text{ and} \quad (3)$$

$$R_aSi[(OSiMe_2)_n(OSiMeH)_cOSiMe_3]_{4-a} \quad (4)$$

wherein
R is a hydrocarbon radical free of aliphatic unsaturation and contains from 1 to 10 carbon atoms, Me is a methyl radical,
a has an average value from 0–1,
n has an average value from 6–240,
d has an average value from 0–30,
b has an average value from 1–30, and
c has an average value from 3–30 to the extent that the ratio of total Me$_2$SiO units to total $$-\underset{\underset{G}{|}}{Si}-O$$

units is within the range of 3.5:1 to 15:1, wherein
G is a radical of the structure —D(OR")$_m$A wherein
D is an alkylene radical containing from 1 to 30 carbons atoms,
A is a radical selected from the group consisting of the —OR', —OOCR' and —OCOR' radicals wherein R' is a radical free of aliphatic unsaturation selected from the group consisting of hydrocarbon and radicals, the A radical containing a total of less than eleven atoms,
R" is composed of ethylene radicals and radicals selected from the group consisting of propylene and butylene radicals, the amount of ethylene radicals relative to the other alkylene radicals being such that the ratio of carbon atoms to oxygen atoms in the total OR" block ranges from 2.3:1 to 2.8:1, and
m has an average value from 25 to 100, Any of the siloxanes 1–4 or mixtures of siloxanes 1–4 can be utilized which give rise to a copolymer when reacted with an unsaturated glycol, in which the ratio of total Me$_2$SiO units to total $$-\underset{\underset{G}{|}}{Si}-O$$

units are derived from the corresponding SiH units so that the same ratio of Me$_2$SiO units to SiH units prevails as for the Me$_2$SiO units to $$-\underset{\underset{G}{|}}{Si}-O$$

units.

The above siloxanes are prepared by cohydrolyzing the appropriate silanes as for instance in (1) above, a mixture of silanes such as R$_a$SiX$_{4-a}$ with dimethyldichlorosilane, methyldichlorosilane, and dimethylmonochlorosilane and thereafter equilibrating the cohydrolyzate with an acid catalyst such as H$_2$SO$_4$. (2) is prepared by cohydrolyzing the silanes in proportion of n mols of dimethyldichlorosilane, two mols of dimethylmonochlorosilane, and b mols of methyldichlorosilane. Once again the hydrolyzate is H$_2$SO$_4$ equilibrated. (3) is prepared by cohydrolyzing the silanes in the proportion of n mols of dimethyldichlorosilane, two mols of trimethylmonochlorosilane and c mols of methyldichlorosilane. Once again the cohydrolyzate is equilibrated with H$_2$SO$_4$. (4) is prepared by cohydrolyzing one mole of silane of the formula R$_a$SiX$_{4-a}$ with n mols of dimethyldichlorosilane, c mols of methyldichlorosilane and at least 4—a mols of trimethylchlorosilane and thereafter equilibrating with H$_2$SO$_4$. In such case, X is chlorine.

Another method of preparing the siloxanes is to equilibrate siloxanes that have already been hydrolyzed. Such a method for instance would involve the equilibration at temperatures in excess of 50° C., a mixture of n units of Me$_2$SiO in the form of octamethylcyclotetrasiloxane, b units of (MeHSiO) in the form of (MeHSiO)$_4$ and 1 unit of (HMe$_2$Si)$_2$O in the presence of an equilibrating catalyst. Such equilibrating catalysts are known in the art and consist of acid clays, acid treated melamine type resins and fluorinated alkanes with sulfonic acid groups. For those unfamiliar with such preparations, they can be found in detail in U.S. Pat. No. 3,402,192 and that patent is hereby incorporated by reference.

The monoalkylene ether of the desired polyoxyalkylene glycol can be a copolymer of ethylene oxide and propylene oxide or copolymers of ethylene oxide and butylene oxide or can be copolymers of all three oxides. The ratio of ethylene radicals relative to the other alkylene radicals should be such that the ratio of carbon atoms to oxygen atoms in the glycol copolymer ranges from 2.3:1 to 2.8:1. In addition, the ends of the polyglycol chain not attached to the siloxane moiety have a group A wherein A is defined above.

These glycol copolymers can be linear or branched and can contain any number of carbon atoms.

One method of preparing the glycol copolymers is to dissolve sodium metal in allyl alcohol in a mole ratio of one to one and reacting the resulting product with the appropriate oxides at elevated temperatures and under pressure. The resulting product, after purification by removal of low boilers, is then capped with the appropriate group A.

The siloxane-oxyalkylene copolymer is then prepared by reacting the appropriate siloxane precursor and the appropriate polyglycol copolymer at elevated temperatures in the presence of platinum as the catalyst and a solvent if desired. These polysiloxane-polyoxyalkylene copolymers are described in U.S. Pat. No. 4,147,847.

Suitable polymethylsiloxanes include the Dow Corning ® 200 fluids reputed to have the following formula:

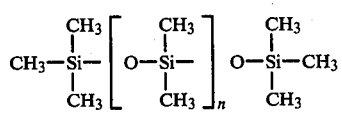

These products may have values of n which vary from 0 to 2000. The average length of the chain determines the viscosity of the fluid. For purposes of the instant invention, those with viscosities of 1.0 to less than 1000 centistokes may be used and preferably 1.0 to 100 centistokes. Other polymethylsiloxanes include polyphenylmethyl siloxanes having formulas similar to the above but substituting phenyl groups for some of the methyl groups. Also similar dimethylsiloxane fluids sold by Union Carbide Corp. under the designation L-45 may be employed.

The polyether cell modifier which may be employed with the polysiloxane polyoxyalkylene surfactant and the polymethylsiloxane will generally have a molecular weight of from about 200 to 10,000. Suitable compounds include polyoxyalkylene-polyether polyols such as the polymerization product of an alkylene oxide or of an alkylene oxide with a polyhydric alcohol. Any suitable polyhydric alcohol may be employed including both aliphatic and aromatic such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, 2-butene-1,4-diol, glycerol, 1,1,1-trimethylolpropane, 1,1,1-trimethylolethane, hexane-1,2,6-triol, α-ethylglucoside, pentaerythritol and sorbitol. Also included with the term polyhydric alcohol are compounds derived from phenolic compounds such as 2,2-bis(4-hydroxyphenyl)propane, commonly known as Bisphenol A, and hydroxyalkyl ethers of such phenolic compounds such as bis-2-hydroxyethylether of hydroxyquinone.

Any suitable alkylene oxide may be used such as ethylene oxide, propylene oxide, butylene oxide, amylene oxide, and heteric or block copolymers of these oxides. However, as pointed out above, this polyol must contain at least 80 percent by weight polyoxyethylene groups. The polyoxyalkylene polyether polyol cell modifier may be prepared from other starting materials such as tetrahydrofuran and alkylene oxide-tetrahydrofuran copolymers; epihalohydrins such as epichlorohydrin; as well as aralkylene oxides such as styrene oxide. The polyoxyalkylene polyether polyol cell modifiers may have either primary or secondary hydroxyl groups and, preferably are polyethers prepared from alkylene oxides having from 2 to 6 carbon atoms such as polyethylene ether glycols, polypropylene ether glycols, and polybutylene ether glycol. However, the resulting product, as pointed out above, must contain at least 80 percent by weight polyoxyethylene groups. The polyoxyalkylene polyether polyols may be prepared by any known process such as, for example, the process disclosed by Wertz in 1859 and *Encyclopedia of Chemical Technology*, Vol. 7, pages 257 to 262, published by Interscience Publishers, Inc. (1951), or in U.S. Pat. No. 1,922,459. Alkylene oxide adducts of Mannich condensation products are also useful in the invention. The above polyether polyol cell modifiers have a molecular weight of the oxyethylene groups from about 200 to 24,000 and contain from about 80 to 100 percent by weight of the oxyethylene groups. Preferred compounds of the above type are the polyethylene glycols having molecular weights of from 200 to 6000.

Among the polyoxyalkylene polyether polyols which can be used in the compositions of the invention are those which correspond to the formula:

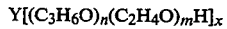

wherein Y is the residue of an organic compound having from about 1 to 6 carbon atoms and containing x reactive hydrogen atoms in which x has a value of at least one, n has a value such that the oxyethylene content of the molecule is from about 80 to 100 weight percent and the total molecular weight of the polyoxyethylene groups is from about 200 to 24,000. Compositions of this type are more particularly described in U.S. Pat. Nos. 2,674,619 and 2,677,700.

Other suitable polyether polyols correspond to the formula:

wherein Y, n, m and x have values as set forth above. Compositions of this type are more particularly described in U.S. Pat. No. 3,036,118. In either of the above formulas, compounds falling within the scope of the definition for Y include, for example, propylene glycol, ethylene glycol, dipropylene glycol, diethylene glycol, glycerine, pentaerythritol, trimethylolpropane, ethylene diamine and the like. Also, the oxypropylene chains optionally, but advantageously, contain small amounts of ethylene oxide and the oxyethylene chains also optionally, but advantageously, contain small amounts of propylene oxide.

Preferred compounds of the above type are those wherein Y is the residue of propylene glycol or ethylene glycol and x is 2.

The total concentration of the cell modifier, i.e., polymethylsiloxane plus polysiloxane polyoxyalkylene copolymer plus polyoxyalkylene ether polyol cell modifier is at least about 0.2 percent by weight of the composition. There is no known maximum amount, the maximum being determined by economics, i.e., costs of the copolymer. The beneficial effects of the addition of these three components, levels off at about 10 percent by weight. It it not believed that anyone would want to use more than about 15 percent by weight of the weight total for these components.

As previously pointed out, the invention lies in the incorporation of the combination of polysiloxanepolyoxyalkylene copolymer, polymethylsiloxane and polyether polyol cell modifier containing at least about 80 percent by weight polyoxyethylene groups, in a conventional flexible polyurethane foam composition which is prepared from polyols and polyisocyanates in the presence of a foaming agent along with the above combination of three cell modifying agents.

Polyols which may be employed for reaction with the polyisocyanates to form the flexible polyurethane foams will generally have an equivalent weight of from about 500 to 3000 and a functionality of from 2 to 8. Suitable compounds include hydroxyl-terminated polyesters, polyoxyalkylenepolyether polyols, and alkylene oxide adducts of organic compounds having at least 2 reactive hydrogen atoms such as amines, acids of phosphorus, dithiols, etc.

Any suitable hydroxyl-terminated polyester may be used such as is obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, 2- butene-1,4-diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenolic compounds such as 2,2-bis(4-hydroxyphenyl)propane, commonly known as Bisphenol A, and hydroxyalkyl ethers of such phenolic compounds such as bis-2-hydroxyethyl ether of hydroxyquinone.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Any suitable polyoxyalkylene ether polyol may be used such as the polymerization product of an alkylene oxide or of an alkylene oxide with a polyhydric alcohol. Any suitable polyhydric alcohol may be used such as those disclosed above for the use in the preparation of the hydroxy-terminated polyesters. Any suitable alkylene oxide may be used such as ethylene oxide, propylene oxide, butylene oxide, amylene oxide, and heteric or block copolymers of these oxides. The polyoxyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72 percent to about 95 percent. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylene diamine, 1,3-propylenediamine; 1,4-butylenediamine, and 1,3-butylene diamine, as well as substituted secondary derivatives thereof.

Hydroxy-containing compounds, which may be employed include graft polyols which may be employed alone or with the polyols set forth above. Preferably, the polyols comprise by weight 5 to 100 percent graft polyol and 0 to 95 percent conventional polyol of the type described above. The graft polyols are prepared by the in situ polymerization of the product of a vinyl monomer or monomers in a reactive polyol medium and in the presence of a free radical initiator. The reaction is generally carried out at a temperature ranging from about 40° C. to 150° C. The reactive polyol medium generally has an equivalent weight of at least about 500 and a hydroxyl number ranging from about 30 to about 600. The graft polyol has an equivalent weight of at least about 500 and a viscosity of less than 40,000 cps. at 10 percent polymer concentration.

A more comprehensive discussion of the graft polyols and their method of preparation can be found in U.S. Pat. Nos. 3,383,351; 3,304,273; 3,652,639; and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542.

The polyols described above for reaction with the polyisocyanate preferably should not contain more than 60 percent by weight polyoxyethylene groups.

In preparing the polyurethane foams of the subject invention, any suitable organic polyisocyanate or mixture thereof can be employed. Representative organic polyisocyanates correspond to the following formula:

$$R(NCO)_z$$

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the useable isocyanates are the modifications of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

Crude polyisocyanate may also be used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The amount of organic polyisocyanate that is employed should generally be sufficient to provide about 0.9 to 1.3 isocyanate groups per hydroxyl plus amine group, if any, of the polyol.

Conventional flame retardants can also be incorporated, preferably in amount of not more than about 20 percent by weight of the reactants.

In addition to the previously described ingredients, other ingredients such as catalysts, dyes, fillers, pigments and the like can be included in the preparation of the foams.

Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol.

A pigment which can be used herein can be any conventional pigment heretofor disclosed in the art such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

Any of the catalysts employed in the preparation of polyurethane foam can be employed in the subject invention. Representative of these catalysts include the amine catalysts such as diethylenetriamine, ketimine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)dodecyl succinate, phenylmercuric benzoate, cadmium naphthenate, dibutyltin dilaurate and dibutyltin-di-2-ethylhexoate. Generally, the total amount of both tin and amine catalysts ranges from about 0.0 to 2.0 parts by weight based on 100 parts by weight of the polyol. Preferred amounts of tin catalysts are 0.001 to 0.20 part by weight based on 100 parts by weight of the polyol while preferred amounts of amine catalysts are 0.05 to 1.0 part by weight based on 100 parts by weight of the polyol.

In preparing the foams of the present invention, any general procedure conventionally used for the preparation of urethane foams can be practiced. Generally speaking, such procedure entails the mixing together of ingredients with agitation until the foaming reaction commences. After foam formation ceases, the resulting product is then cured at a temperature ranging from about 25° C. to 150° C. for about 5 minutes to 24 hours.

Suitable processes for the preparation of cellular polyurethane plastics are disclosed in U.S. Pat. No. Re. 24,514 together with suitable machinery to be used in conjunction therewith. When water is added as the blowing agent, generally in amount of about 1.0 to 5.5 percent by weight of the polyol, corresponding quantities of isocyanate to react with the water and produce carbon dioxide are used. It is also possible to proceed with the preparation of the polyurethane plastics by a prepolymer technique wherein an excess of organic polyisocyanate is reacted in a first step with a polyol, as described above, to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used in amount generally not greater than about 30 percent by weight of the polyol as blowing agents.

For more complete understanding of the present invention, reference is made to the following non-limiting examples wherein all parts are by weight unless otherwise noted.

In the Examples, the following expressions are employed.

Gurley air flow—a measure of the openness of the foam cells. More specifically, the Gurley air flow value is the time in seconds required for 1000 cc's of air to pass through the foams as measured by an instrument known as the Gurley Densometer. Thus, a high value indicates a closed cell foam while a low value indicates an open cell foam.

Rise time top/cup—the time elapsed from the addition of the isocyanate to the resin blend until the foam rises to the top of an 83 ounce 5¼ inch deep frusto conical paper cup having a 7 inch top diameter and a 5½ inch bottom diameter.

Gas off—the time elapsed from the addition of the isocyanate to the breaking of bubbles on the top surface of the foam.

Foam height—the perpendicular distance from the bottom of the 83 ounce conical cup to the top of the foam.

Foam weight—the weight of the cured foam in the 83 ounce conical cup.

The isocyanate employed in all of the examples is an 80/20 by weight blend of toluene diisocyanate and a polymeric isocyanate readily available on the market under the trademark MONDUR MRS.

Dabco 33LV—33 percent solution of triethylene diamine in dipropylene glycol, a product of Air Products Inc.

X-DM=N-(dimethylaminoethyl)morpholine.

The word "index" preceded by the three digit number (after TDI) indicates a ratio of the actual amount of isocyanate used in a formulation to the theoretical amount required to react one NCO group with one OH group wherein the value of the theoretical amount is 100.

EXAMPLES 1-10

Hand-mixed foams were prepared for the ten examples having compositions indicated in Table I below as follows: All of the ingredients except the isocyanate were weighed into a 1-quart plastic-lined cardboard cylindrical container and mixed with a stirrer at 3500 RPM for 30 seconds. The stirrer was turned off for 15 seconds and then started again. After additional mixing for 15 seconds, and without stopping the stirrer, the isocyanate was rapidly added. Stirring was continued for about 6 seconds, the stirrer stopped, and the foam forming mixture rapidly transferred to an above described 83 oz. paper cup. These were free rise foams which were observed as they rise and the time to reach the top of the cup recorded. The gas-off time (health bubbles) was also recorded, as it occurred. The properties of these foams are set forth in Table I below.

only 10 percent oxyethylene groups, exhibited moderately extreme top shrinkage. While Example 6 looks satisfactory in Table I, it exhibited undesirable internal foam collapse. Examples 7, 8 and 9 illustrate the effect of varying quantities of the high polyoxyethylene group containing polyol cell modifier. More specifically, with one part of said polyol, fine cell size was obtained and no top shrinkage, bottom holes, body shrinkage or top skin dimples were indicated. The same is true of Example 8 employing 2.0 parts of said polyol with the exception that this foam exhibited some sigh back. Foam 9 containing 3 parts of said polyol collapsed.

In the above table:

Polyol #1 is a glycerine-polyoxypropylene-polyoxyethylene triol of about 6500 molecular weight containing 15 percent by weight ethylene oxide cap.

Polyol #2 is a glycerine-polyoxypropylene-polyoxyethylene graft polyol containing 20 percent grafted ethylenically unsaturated monomer having a molecular weight of about 6000.

Polyol #3 is a polyoxyethylene glycol having a molecular weight of about 4000.

Polyol #4 defines the polyoxyethylene adduct of a polyoxypropylene hydrophobic base, said hydrophobic base having a molecular weight of about 950 wherein the oxyethylene content is about 80 weight percent of the molecule. This product is readily available on the market under the trademark PLURONIC F38.

Polyol #5 defines the polyoxyethylene adduct of a polyoxypropylene hydrophobic base, said hydrophobic base having a molecular weight of about 3250 wherein the oxyethylene content is about 10 weight percent of

TABLE I

| Example | 1 | 2 | 3 | 4 | 5 | 6 | 7 | 8 | 9 |
|---|---|---|---|---|---|---|---|---|---|
| Polyol 1, parts by weight | 80 | 80 | 80 | 80 | 80 | 80 | 80 | 80 | 80 |
| Polyol 2, parts by weight | 20 | 20 | 20 | 20 | 20 | 20 | 20 | 20 | 20 |
| Water, parts by weight | 2.8 | 2.8 | 2.8 | 2.8 | 2.8 | 2.8 | 2.8 | 2.8 | 2.8 |
| DABCO 33 LV Catalyst, parts by weight | 0.6 | 0.6 | 0.6 | 0.6 | 0.6 | 0.6 | 0.6 | 0.6 | 0.6 |
| X-DM Catalyst, parts by weight | 0.2 | 0.2 | 0.2 | 0.2 | 0.2 | 0.2 | 0.2 | 0.2 | 0.2 |
| Dimethylethanolamine, parts by weight | 0.3 | 0.3 | 0.3 | 0.3 | 0.3 | 0.3 | 0.3 | 0.3 | 0.3 |
| Polymethylsiloxane 1, parts by weight | 0.04 | 0.04 | 0.04 | 0.04 | 0.04 | 0.04 | 0.04 | 0.04 | 0.04 |
| Polysiloxane-polyoxyalkylene copolymer 1, parts by weight | 0.04 | 0.04 | 0.04 | 0.04 | 0.04 | — | 0.04 | 0.04 | 0.04 |
| Polyol 4, parts by weight | 1.0 | — | — | — | — | — | — | — | — |
| Polyol 5, parts by weight | — | — | — | — | 1.0 | — | — | — | — |
| Polyol 6, parts by weight | — | 1.0 | — | — | — | — | — | — | — |
| Polyol 3, parts by weight | — | — | 1.0 | — | — | — | 1.0 | 2.0 | 3.0 |
| Isocyanate 1 (103 Index), parts by wt | 35.3 | 35.3 | 35.3 | 35.3 | 35.3 | 35.3 | 35.3 | 35.3 | 35.3 |
| Rise time, Top of cup, sec. | 40 | 40 | 40 | 39 | 39 | 41 | 40 | 37 | 40 |
| Foam weight, g | 173 | 174 | 174 | 173 | 176 | 176 | 174 | 171 | 176 |
| Foam height, mm | 203 | 204 | 199 | 195 | 195 | 192 | 199 | 159 | 60 |
| Top shrinkage | VS | N | N | ME | ME | N | N | N | C |
| Bottom holes | N | N | N | N | N | N | N | N | C |
| Cell size | MF | F | F | MF | MF | MF | F | MF | C |
| Body shrinkage | N | N | N | N | N | N | N | N-SB | C |
| Top skin dimples | N | N | N | N | N | N | N | N | C |

N = none; VS = very slight; MF = medium fine; F = fine; ME = moderately extreme; SB = sigh back; C = collapsed From the above, it can be seen that the examples employing all three cell modifier components, i.e., polymethyl siloxane, polysiloxane-polyoxyalkylene copolymer, and the polyol cell modifiers containing a high percentage of oxyethylene groups, all exhibited fine or medium fine cell size, exhibited very slight or no top shrinkage, and contained no bottom holes, no body shrinkage, and no top skin dimples when employed in amounts within the scope of the instant invention. That is to say those examples which contained less than 3 parts by weight of the polyol cell modifier, namely, Examples 1-3, 7 and 8. Example 4, which contains no high oxyethylene-containing polyol cell modifier and Example 5 which contained a polyol cell modifier with the molecule. This product is readily available on the market under the trademark PLURONIC L101.

Polyol #6 defines the polyoxyethylene adduct of a polyoxypropylene hydrophobic base, said hydrophobic base having a molecular weight of about 3250 wherein the oxyethylene content is about 80 weight percent of the molecule. This product is readily available on the market under the trademark PLURONIC F108.

Polymethylsiloxane #1 is reputed to have the following formula:

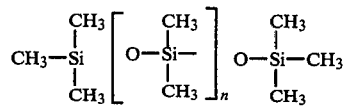

and has a viscosity of 5 centistokes at 25° C. Such product is readily available on the market under the trademark Dow Corning 200 fluid.

Polysiloxane-polyoxyalkylene copolymer #1 is a silicone-glycol copolymer commercially available as Dow Corning 196, in which the silicone portion is basically methylsiloxanes and the glycol portions are essentially composed of ethylene oxide and propylene oxide units, said product having a viscosity of 2000 centistokes.

EXAMPLES 11–48

Foams were prepared for the 38 examples having the compositions set forth below in parts by weight employing the procedure of Examples 1–10 except that Examples 37 to 48 were molded foams rather than free rise foams.

| Foam Formulation for Examples 11–48 | | |
|---|---|---|
| Formulation, parts by weight | Examples 20–36 | Examples 11–19 & 37–48 |
| Polyol | — | 80 |
| Polyol 7 | 80 | — |
| Polyol 2 | 20 | 20 |
| Water | 2.8 | 2.8 |
| DABCO 33LV Catalyst | 0.6 | 0.6 |
| X-DM Catalyst | 0.2 | 0.6 |
| Dimethylethanolamine | 0.3 | 0.3 |
| Polyol 3 | variable | variable |
| Polydimethylsiloxane 1 | variable | variable |
| Polysiloxane-polyoxyalkylene copolymer 1 | variable | variable |
| Isocyanate 1 (103 index) | 35.4 | 35.3 |

The amounts of polyol #3, polymethylsiloxane 1, and polysiloxane-polyoxyalkylene polymer #1 are set forth in Tables II and III below along with the properties of the foams prepared therefrom.

TABLE II

| | Parts by Weight | | | Rise Time, Sec. | | Top Shrink-age | Cell Size | | | Gurley Air Flow | Foam Height | Foam Weight |
|---|---|---|---|---|---|---|---|---|---|---|---|---|
| Example | Polyol #3 | Polymethyl-Siloxane #1 | Polysiloxane-Polyoxyalkylene Polymer #1 | Top/Cup | Gas Off | | Center | Edge | Remarks | Sec/1000cc | mm | g |
| 11 | 1.0 | — | 0.05 | 39 | 93 | — | L | V | FC | — | 122 | 176 |
| 12 | 1.0 | — | 0.06 | 37 | N | N | L | L | PMT | 27.7 | 201 | 183 |
| 13 | 1.0 | 0.06 | — | 35 | 85 | — | — | — | FC | — | 54 | 173 |
| 14 | 1.0 | 0.06 | 0.06 | 38 | 121–140 | N | MF | MF | — | 31.0 | 195 | 174 |
| 15 | — | 0.06 | 0.06 | 37 | N | ME | MF | MF | — | 58.7 | 213 | 178 |
| 16 | — | 0.06 | — | 36 | 125–180 | N | MF | MF | IH | 13.1 | 189 | 177 |
| 17 | — | — | 0.06 | 36 | N | E | L | L | PMT | 52.3 | 157 | 177 |
| 18 | — | — | — | 37 | 110 | — | VL | V | FC | — | 108 | 172 |
| 19 | 1.0 | — | — | 38 | 75 | — | — | — | FC | — | 75 | 172 |
| 20 | — | 0.04 | 0.04 | 37 | N | EXT | MF | M | — | 32.1 | 191 | 174 |
| 21 | 1.0 | 0.04 | 0.04 | 37 | N | VS | MF | M | — | 14.2 | 204 | 175 |
| 22 | — | 0.04 | 0.04 | 37 | N | EXT | MF | M | — | 33.1 | 188 | 168 |
| 23 | 1.0 | 0.04 | 0.04 | 38 | 170 | VS | MF | M | — | 14.6 | 203 | 175 |
| 24 | 1.0 | 0.02 | 0.04 | 36 | N | VS | MF | M | — | 13.6 | 201 | 179 |
| 25 | 1.0 | 0.06 | 0.04 | 38 | N | VVS | MF | M | — | 14.7 | 201 | 165 |
| 26 | 1.0 | 0.04 | 0.06 | 40 | N | M | F | M | — | 28.3 | 207 | 174 |
| 27 | 1.0 | 0.04 | 0.02 | 41 | 185 | N | MF | M | — | 7.1 | 196 | 171 |
| 28 | 1.5 | 0.04 | 0.04 | 38 | 157 | VVS | MF | M | — | 11.3 | 199 | 174 |
| 29 | 1.0 | 0.05 | 0.03 | 37 | 168 | N | MF | MF | — | 9.1 | 197 | 173 |
| 30 | — | 0.05 | — | 37 | N | VS | MF | M | some internal holes | 13.3 | 195 | 172 |
| 31 | — | 0.05 | 0.03 | 37 | N | M | MF | M | some internal holes | 28.5 | 193 | 171 |
| 32 | 1.0 | 0.05 | — | 38 | 205 | N | M | ML | some internal holes | 8.1 | 193 | 171 |
| 33 | 1.0 | — | 0.03 | 38 | N | N | M | VL | top badly pock marked | 9.6 | 196 | 181 |
| 34 | 1.0 | — | — | 39 | — | N | — | — | PCK | 3.5 | 162 | 177 |
| 35 | — | — | 0.03 | 39 | N | E | ML | L | top pock marked | 18.2 | 156 | 170 |
| 36 | — | — | — | 39 | — | N | ML | VL | top pock marked | 6.1 | 192 | 184 |

PC = partial collapse, void, at edge; ML = medium large; MF = medium fine; EXT = extreme; VVS = very, very slight; L = large; VL = very large; M = medium; FC = foam collapse; V = voids; PMT = pock marked top, IH = internal holes; E = excellent; N, VS, F, HF and ME are the same as for Table I.

TABLE III

| | Parts by Weight | | | | Foam Weight | | Cell Size | | |
|---|---|---|---|---|---|---|---|---|---|
| Example | Polyol #3 | Polymethyl-Siloxane #1 | Polysiloxane-Polyoxyalkylene Polymer #1 | Mold Fill | (grams) | Surface | Surface | Internal | Remarks |
| 37 | 1.0 | 0.06 | 0.06 | G | 291 | E | EF | MF | Excellent foam |
| 38 | 1.0 | 0.06 | 0.06 | G | 272 | G | VF | M | Good Foam |
| 39 | 1.0 | 0.06 | 0.06 | G | 272 | E | EF | MF | Good Foam |

TABLE III-continued

| | Parts by Weight | | | | | | Cell Size | | |
|---|---|---|---|---|---|---|---|---|---|
| Example | Polyol #3 | Polymethyl-Siloxane #1 | Polysiloxane-Polyoxyalkylene Polymer #1 | Mold Fill | Foam Weight (grams) | Surface | Surface | Internal | Remarks |
| 40 | 1.0 | 0.06 | 0.06 | G | 261 | G | VF | M | Good Foam |
| 41 | — | 0.06 | 0.06 | G | 261 | G | VF | MF | Foam shrank badly |
| 42 | — | 0.06 | — | G | 262 | G | VF | M | Large internal voids |
| 43 | — | — | 0.06 | G | 268 | T | RL | M | Foam shrank badly |
| 44 | — | — | — | G | 270 | P | VL | VL | Extremely large Cells |
| 45 | 1.0 | 0.06 | 0.06 | G | 265 | E | EF | MF | Good Foam |
| 46 | 1.0 | 0.06 | — | LG | 260 | — | — | — | Completely hollow inside |
| 47 | 1.0 | — | 0.06 | G | 272 | T | RL | M | Flaws internally |
| 48 | 1.0 | — | — | — | 274 | — | — | — | Foam collapsed |

G = good; E = excellent; T = transparent; P = poor; VF = very fine; EF = extremely fine; RL = relatively large; M = medium; MF = medium fine; VL = very large In the above examples, polyol #7 is a trimethylolpropane initiated polyoxypropylene-polyoxyethylene polyol having a molecular weight of about 6700 and having a 15 percent by weight polyoxyethylene cap.

Polyols 1, 2 and 3 as well as the polymethylsiloxane 1 and polysiloxane-polyoxyalkylene copolymer 1, are the same as set forth under Examples 1–10.

From the above table, it can be seen that superior foam properties are obtained where all three cell modifiers are employed, i.e., polydimethylsiloxane, polysiloxanepolyoxyalkylene copolymer, and polyether polyol cell modifier containing a high percentage of oxyethylene groups.

EXAMPLES 49–66

Foams were prepared for the 18 examples having compositions indicated below. The amount of polyol 8 or polyol 9 is given in Table IV below along with the properties of the foam.

Foam Formulation for Examples 49–66
Formulation, pbw.

| Polyol 1 | 80 |
|---|---|
| Polyol 2 | 20 |
| Water | 2.8 |
| DABCO 33LV Catalyst | 0.6 |
| X-DM Catalyst | 0.2 |
| Dimethylethanolamine | 0.3 |
| Polyol 8 or 9 | Variable |
| Polydimethylsiloxane #1 | 0.06 |

-continued

Foam Formulation for Examples 49–66
Formulation, pbw.

| Polysiloxane-polyoxyalkylene copolymer #1 | 0.06 |
|---|---|
| Isocyanate #1 | 103 Index |

TABLE IV

| | Parts by Weight | | Rise Time, Sec. | | Top | | | Gurley Air Flow | Foam Height | Foam Weight |
|---|---|---|---|---|---|---|---|---|---|---|
| Example | Polyol #8 | Polyol #9 | Top/Cup | Gas Off | Shrinkage | Cell Size | Remarks | Sec/1000cc | mm | g |
| 49 | 1.0 | — | 34 | N | E | M | — | 51.3 | 192 | 176 |
| 50 | 2.0 | — | 35 | N | E | M | — | 51.1 | 178 | 172 |
| 51 | 3.0 | — | 34 | N | E | M | — | 48.7 | 176 | 177 |
| 52 | 5.0 | — | 35 | N | E | M | — | 48.5 | 164 | 173 |
| 53 | 10.0 | — | 32 | N | N | M | SBT | 36.7 | 201 | 174 |
| 54 | 20.0 | — | 31 | 43 | — | — | FC | — | 93 | 174 |
| 55 | 1.0 | — | 30 | N | E | M | — | 59.3 | 175 | 176 |
| 56 | 2.0 | — | 30 | N | E | M | — | 61.9 | 166 | 170 |
| 57 | 3.0 | — | 28 | N | E | M | — | 70.0 | 166 | 179 |
| 58 | 5.0 | — | 26 | N | E | M | — | 73.4 | 167 | 177 |
| 59 | 9.0 | — | 24 | 123 | N | M | SBT | 41.0 | 202 | 174 |
| 60 | 17.0 | — | 22 | 60 | — | VL | PFC | — | 157 | 172 |
| 61 | — | 1.0 | 30 | N | E | M | — | 51.9 | 190 | 185 |
| 62 | — | 2.0 | 31 | N | ME | M | — | 54.5 | 197 | 175 |
| 63 | — | 3.0 | 30 | N | E | M | — | 46.4 | 185 | 180 |
| 64 | — | 5.0 | 34 | N | S | M | SBT | 54.5 | 207 | 182 |
| 65 | — | 7.5 | 35 | N | S | M | SBT | 58.5 | 207 | 182 |
| 66 | — | 10.0 | 37 | 90 | — | — | FC | — | 67 | 178 |

N = none; E = extreme; M = medium; SBT = slightly bumpy top; FC = foam collapsed; VL = very large; PFC = partial foam collapse; ME = moderately extreme; S = slight Polyol #8 is a 200 molecular weight polyoxyethylene glycol and polyol #9 is a 600 molecular weight polyoxyethylene glycol.

These examples demonstrate that good foams can be produced with concentration of the 200 molecular weight polyoxyethylene glycol of around 9 or 10 parts by weight and for the 600 molecular weight polyoxyethylene glycol of more than 3 but less than 10.

As can be seen in Table IV, two series of levels of polyol 8 were investigated. The second series is essentially a repeat of the first with the exception that a correction was made such that catalyst concentrations were constant. That is, a correction was made for the dilution by the polyol 8. The study was done in the second series such that 100 parts by weight of polyol included polyol 8 along with polyols 1 and 2. In the first series, polyol #8 was added in addition to the 100 parts by weight of polyol #1 and #2.

EXAMPLES 67–112

Foams were prepared for the 46 examples having compositions indicated below. The amount of polyol cell modifier is given in Table V below along with the properties of the foam.

| Foam Formulation for Examples 67–112 |   |
|---|---|
| Formulation, pbw. | |
| Polyol 1 | 80 |
| Polyol 2 | 20 |

-continued

| Foam Formulation for Examples 67–112 |   |
|---|---|
| Formulation, pbw. | |
| Polysiloxane-polyalkylene copolymer #1 | 0.06 |
| Isocyanate 1 | 103 Index |

TABLE V

| Example | Parts by Weight Polyol #8 | Polol #9 | Polyol #10 | Rise Time, Sec. Top/Cup | Gas Off | Top Shrinkage | Cell Size | Remarks | Gurley Air Flow Sec/1000cc | Foam Height mm | Foam Weight g |
|---|---|---|---|---|---|---|---|---|---|---|---|
| 67 | 10.0 | — | — | 30 | N | VS | M | — | 33.8 | 197 | 177 |
| 68 | 8.0 | — | — | 31 | N | M | M | — | 38.8 | 196 | 172 |
| 69 | 15.0 | — | — | 30 | 110 | — | ML | PFC | — | 150 | 178 |
| 70 | 12.0 | — | — | 30 | N | N | M | — | 33.4 | 186 | 174 |
| 71 | — | 4.0 | — | 40 | N | ME | M | — | 53.1 | 207 | 168 |
| 72 | — | 5.0 | — | 40 | N | M | M | — | 55.3 | 208 | 170 |
| 73 | — | 9.0 | — | 40 | 95 | — | ML | PFC | — | 133 | 175 |
| 74 | — | 8.0 | — | 40 | 151 | N | M | — | 45.3 | 206 | 173 |
| 75 | — | — | 1.0 | 38 | N | M | MF | — | 56.6 | 212 | 169 |
| 76 | — | — | 2.0 | 38 | N | S | MF | — | 39.7 | 211 | 172 |
| 77 | — | — | 3.0 | 37 | N | N | MF | — | 36.4 | 210 | 178 |
| 78 | — | — | 5.0 | 38 | 103 | N | L | PFC | — | 151 | 170 |
| 79 | — | — | 4.0 | 40 | 134 | N | MF | — | 37.5 | 202 | 171 |

| Example | Parts by Weight Polyol #3 | Polol #11 | Polyol #5 | Rise Time, Sec. Top/Cup | Gas Off | Top Shrinkage | Cell Size | Remarks | Gurley Air Flow Sec/1000cc | Foam Height mm | Foam Weight g |
|---|---|---|---|---|---|---|---|---|---|---|---|
| 80 | 0.5 | — | — | 35 | N | S | MF | — | 43.5 | 213 | 174 |
| 81 | 1.0 | — | — | 37 | N | N | M | — | 28.9 | 206 | 170 |
| 82 | 2.0 | — | — | 40 | 101 | N | L | PFC | — | 138 | 161 |
| 83 | 3.0 | — | — | 42 | 101 | N | — | FC | — | 72 | 160 |
| 84 | 0.2 | — | — | 41 | N | E | M | — | 41.1 | 175 | 163 |
| 85 | — | 0.5 | — | 37 | N | M | M | — | 33.2 | 204 | 170 |
| 86 | — | 1.0 | — | 40 | N | N | M | — | 30.0 | 200 | 161 |
| 87 | — | 2.0 | — | 43 | N | N | L | FC | — | 128 | 160 |
| 88 | — | — | 1.0 | 43 | N | E | M | — | 47.1 | 159 | 160 |
| 89 | — | — | 5.0 | 46 | N | E | MF | — | 45.8 | 156 | 161 |
| 90 | — | — | 10.0 | 52 | N | E | MF | — | 43.5 | 155 | 164 |
| 91 | — | — | 20.0 | 67 | N | E | MF | — | 43.3 | 153 | 165 |

| Example | Parts by Weight Polyol #12 | Polyol #13 | Polyol #14 | Rise Time, Sec. Top/Cup | Gas Off | Top Shrinkage | Cell Size | Remarks | Gurley Air Flow Sec/1000cc | Foam Height mm | Foam Weight g |
|---|---|---|---|---|---|---|---|---|---|---|---|
| 92 | 1.0 | — | — | 41 | N | E | MF | — | 49.3 | 160 | 163 |
| 93 | 5.0 | — | — | 45 | N | E | MF | — | 44.3 | 157 | 161 |
| 94 | 10.0 | — | — | 51 | N | E | MF | — | 42.3 | 155 | 163 |
| 95 | 20.0 | — | — | 62 | N | E | M | — | 41.7 | 153 | 175 |
| 96 | — | 1.0 | — | 41 | N | E | MF | — | 46.2 | 161 | 164 |
| 97 | — | 5.0 | — | 45 | N | E | M | — | 50.9 | 160 | 166 |
| 98 | — | 10.0 | — | 48 | N | E | M | — | 43.7 | 154 | 162 |
| 99 | — | 20.0 | — | 56 | N | E | M | — | 55.3 | 152 | 175 |
| 100 | — | — | 1.0 | 40 | N | M | M | — | 33.8 | 197 | 165 |
| 101 | — | — | 2.0 | 40 | N | VS | M | — | 29.3 | 200 | 164 |
| 102 | — | — | 5.0 | 42 | 104 | N | L | PFC | — | 156 | 162 |
| 103 | — | — | 4.0 | 50 | N | N | L | PFC | — | 158 | 163 |
| 104 | — | — | 3.0 | 43 | 120 | N | ML | — | 31.7 | 190 | 165 |

| Example | Parts by Weight Polyol #14 | Polyol #15 | Rise Time, Sec. Top/Cup | Gas Off | Top Shrinkage | Cell Size | Remarks | Gurley Air Flow Sec/1000cc | Foam Height mm | Foam Weight g |
|---|---|---|---|---|---|---|---|---|---|---|
| 105 | 1.0 | — | 41 | N | E | M | — | 42.8 | 163 | 167 |
| 106 | 5.0 | — | 44 | N | E | M | — | 44.7 | 160 | 170 |
| 107 | 10.0 | — | 50 | N | E | M | — | 45.1 | 156 | 169 |
| 108 | 20.0 | — | 58 | N | E | ML | — | 47.3 | 154 | 165 |
| 109 | — | 1.0 | 40 | N | ME | M | — | 3.3 | 182 | 162 |
| 110 | — | 2.0 | 45 | N | E | M | — | 43.8 | 162 | 166 |
| 111 | — | 5.0 | 47 | N | E | M | — | 43.6 | 181 | 163 |
| 112 | — | 20.0 | 64 | N | ME | M | — | 34.2 | 190 | 187 |

N = none; VS = very slight; M = medium; ML = medium large; PFC = partial foam collapse; ME = moderately extreme; MF = medium fine; S = slight; L = large; E = extreme; FC = foam collapse

| Water | 2.8 |
|---|---|
| DABCO 33LV Catalyst | 0.6 |
| X-DM Catalyst | 0.2 |
| Dimethylethanolamine | 0.3 |
| Polyol cell modifier | Variable |
| Polymethylsiloxane #1 | 0.06 |

Polyol #10 is a polyoxyethylene glycol having a molecular weight of 1500.

Polyol #11 is a polyoxyethylene glycol having a molecular weight of 6000.

Polyol #12 defines the polyoxyethylene adduct of a polyoxypropylene hydrophobic base, said hydrohobic base having a molecular weight of about 2750 wherein the oxyethylene content is about 20 weight percent of the molecule. This product is readily available on the market under the trademark PLURONIC L92.

Polyol #13 defines the polyoxyethylene adduct of a polyoxypropylene hydrophobic base, said hydrophobic base having a molecular weight of about 2250 wherein the oxyethylene content is about 40 percent by weight of the molecule. This product is readily available on the market under the trademark PLURONIC P84.

Polyol #14 defines the polyoxyethylene adduct of a polyoxypropylene hydrophobic base, said hydrohobic base having a molecular weight of about 2050 wherein the oxyethylene content is about 50 percent by weight of the molecule. This product is readily available on the market under the trademark PLURONIC P75.

Polyol #15 defines the polyoxyethylene adduct of a polyoxypropylene hydrophobic base, said base having a molecular weight of about 2050 wherein the oxyethylene content is about 70 percent by weight of the molecule. This product is readily available on the market under the trademark PLURONIC F77. All other components of this composition are as defined in the previous examples.

The above data demonstrates that all the polyoxyethylene glycols are effective within certain specified ranges for each one. More specifically, that with a molecular weight of 200 is effective in a range of 9 to 13 parts by weight, that with a molecular weight of 600 is effective within a range of 5 to 8 parts by weight, and that with a molecular weight of 1500 is effective in a range of 1 to 4 parts by weight, that with a molecular weight of 4000 is effective in a range of about 0.5 to 2.0 parts by weight, and that with a molecular weight of 6000 is effective in a range of 0.5 to 1.5 parts by weight.

The data also demonstrates that the minimum of 80 percent oxyethylene groups is essential to be effective at any of the percentages or any of the concentrations tried. The polyol #4 which is sold under the trademark PLURONIC F-38 is effective in a range of about 1 to 3 parts by weight.

EXAMPLES 113-154

Foams were prepared for the 42 examples having compositions indicated below. The amount of polyol 8 or polyol 9 is given in Table VI below along with the properties of the foam.

| Foam Formulations for Examples 113-134 | | | |
|---|---|---|---|
| Formulation, pbw. | 1 | 2 | 3 |
| Polyol 1 | 80 | 80 | 80 |
| Polyol 2 | 20 | 20 | 20 |
| Water | 2.8 | 2.8 | 2.8 |
| DABCO 33LV Catalyst | 0.6 | 0.6 | 0.6 |
| XDM Catalyst | 0.2 | 0.2 | 0.2 |
| Dimethylethanolamine | 0.3 | 0.3 | 0.3 |
| Polyol #3 | 0.2 | 0.2 | Variable |
| Polymethylsiloxane #1 | 0.06 | — | 0.03 |
| Polysiloxane-polyoxyalkylene copolymer #1 | — | 0.06 | 0.03 |
| Isocyanate 1 | 103 | 103 | 103 |

Seven different polysiloxane-polyoxyalkylene copolymers were employed, using formulation 1 set forth above, said copolymers being indicated in Table VI below. The physical properties obtained with these foams are shown in Table VI below.

TABLE VI

| Example | Copolymer # | Parts by Weight | Rise Time, Sec. Top/Cup | Rise Time, Sec. Gas Off | Top Shrinkage | Cell Size | Remarks | Gurley Air Flow Sec/1000cc | Foam Height mm | Foam Weight g |
|---|---|---|---|---|---|---|---|---|---|---|
| 113 | 2 | 0.06 | 43 | N | M | MF | — | 69.1 | 200 | 160 |
| 114 | 2 | 0.03 | 42 | N | VS | MF | — | 30.5 | 200 | 162 |
| 115 | 2 | 0.15 | 43 | 130 | N | M | — | 17.9 | 188 | 159 |
| 116 | 1 | 0.06 | 43 | N | VS | MF | — | 33.5 | 204 | 154 |
| 117 | 1 | 0.03 | 42 | 142 | N | M | — | 26.3 | 194 | 157 |
| 118 | 1 | 0.015 | 42 | 125-147 | N | M | — | 16.1 | 190 | 162 |
| 119 | 3 | 0.06 | 40 | N | M | M | — | 76.6 | 196 | 160 |
| 120 | 3 | 0.03 | 42 | N | VS | M | — | 32.7 | 198 | 155 |
| 121 | 3 | 0.015 | 41 | 135 | N | M | — | 17.5 | 195 | 158 |
| 122 | 4 | 0.06 | 43 | N | M | M | — | 72.7 | 188 | 157 |
| 123 | 4 | 0.03 | 42 | 144 | VS | M | — | 28.4 | 196 | 156 |
| 124 | 4 | 0.015 | 41 | 120-151 | N | M | — | 17.5 | 195 | 164 |
| 125 | 5 | 0.06 | 42 | N | E | MF | — | 99.6 | 166 | 167 |
| 126 | 5 | 0.03 | 44 | N | M | M | — | 36.1 | 196 | 157 |
| 127 | 5 | 0.015 | 41 | 142 | N | M | — | 13.2 | 196 | 164 |
| 128 | 6 | 0.12 | 42 | N | VS | MF | — | 37.6 | 202 | 160 |
| 129 | 6 | 0.06 | 43 | 132 | N | M | — | 23.5 | 196 | 161 |
| 130 | 6 | 0.03 | 43 | 120-151 | N | M | — | 17.5 | 188 | 160 |
| 131 | 7 | 0.12 | 43 | 132-151 | N | M | — | 35.9 | 197 | 160 |
| 132 | 7 | 0.06 | 41 | 122-145 | N | M | — | 18.3 | 191 | 161 |
| 133 | 7 | 0.03 | 43 | 120-155 | N | M | — | 15.7 | 181 | 158 |
| 134 | 8 | 0.06 | 43 | N | M | MF | — | 54.3 | 188 | 157 |
| 135 | 8 | 0.03 | 43 | 131-144 | N | M | — | 23.7 | 193 | 157 |
| 136 | 8 | 0.015 | 42 | 122-144 | N | M | — | 20.0 | 186 | 159 |

N = none; M = medium; MF = medium fine; VS = very slight; E = extreme

The formulation 2 above was employed using three different polymethylsiloxanes said polymethylsiloxanes being indicated in Table VII below along with the properties achieved thereby.

TABLE VII

| Example | Poly-Methyl Siloxane # | Parts by Weight | Rise Time, Sec. Top/Cup | Rise Time, Sec. Gas/Off | Top Shrinkage | Cell Size | Remarks | Gurley Air Flow Sec/1000cc | Foam Height mm | Foam Weight g |
|---|---|---|---|---|---|---|---|---|---|---|
| 137 | 2 | 0.06 | 42 | 130-154 | N | MF | — | 22.2 | 197 | 159 |
| 138 | 2 | 0.12 | 44 | 126-180 | N | M | — | 25.5 | 188 | 159 |
| 139 | 2 | 0.25 | 42 | 121-147 | N | M + L | — | 27.3 | 188 | 162 |
| 140 | 2 | 1.0 | 45 | 125-151 | N | M + L | — | 32.5 | 188 | 161 |
| 141 | 2 | 2.0 | 42 | 120 | VS | M + L | VD | 46.3 | 185 | 161 |
| 142 | 1 | 0.01 | 42 | N | VS | M + L | CR | 33.9 | 198 | 157 |
| 143 | 1 | 0.03 | 41 | N | S | MF | — | 44.5 | 203 | 158 |
| 144 | 1 | 0.06 | 41 | N | S | MF | — | 71.3 | 204 | 160 |
| 145 | 1 | 1.0 | 44 | N | M | VL | — | 23.7 | 190 | 160 |
| 146 | 3 | 0.06 | 35 | — | — | — | TC | — | — | — |
| 147 | 4 | 0.06 | 43 | N | N | M + L | PM | 12.6 | 176 | 156 |
| 148 | 4 | 0.10 | 43 | N | N | M + L | PM | 16.1 | 196 | 163 |
| 149 | 4 | 0.30 | 44 | N | N | M | SPM | 30.0 | 195 | 160 |
| 150 | 4 | 0.50 | 43 | N | N | M | — | 27.2 | 192 | 157 |
| 151 | 4 | 1.50 | 44 | N | N | MF | — | 54.7 | 195 | 164 |

N = none; MF = medium fine; M = medium; L = large; VS = very slight; VD = internal void; CR = crater-like skin; VL = very large; TC = total foam collapse; PM = pock-marked skin; SPM = slightly pock-marked skin; S = slight Using formulation 3 above, the amount of polyol 3 was varied and the results and amounts are set forth in Table VIII below.

TABLE VIII

| Example | Polyol #3 (pbw) | Rise Time, Sec. Top/Cup | Rise Time, Sec. Gas Off | Top Shrinkage | Cell Size | Remarks | Gurley Air Flow Sec/1000cc | Foam Height mm | Foam Weight g |
|---|---|---|---|---|---|---|---|---|---|
| 152 | 0.2 | 44 | N | VS | MF | SB | 27.4 | 201 | 160 |
| 153 | 0.4 | 42 | 135 | N | MF | — | 32.0 | 200 | 166 |
| 154 | 0.8 | 44 | 120-142 | N | M | — | 32.7 | 190 | 157 |

N = none; VS = very slight; MF = medium fine; SB = slightly bumpy skin; M = medium In the above tables:

Copolymer #2 may be described as a silicone-glycol copolymer in which the silicone portion is basically methylsiloxanes and the glycol portions are essentially composed of ethylene oxide and propylene oxide units, said product having a viscosity of 1500 centistokes at 25° C. Such product is readily available on the market under the trademark Dow Corning 190 surfactant.

Copolymer #3 may be described as a silicone-glycol copolymer in which the silicone portion is basically methylsiloxanes and the glycol portions are essentially composed of ethylene oxide and propylene oxide units, said product having a viscosity of 1500 centistokes at 25° C. Such product is readily available on the market under the trademark Dow Corning 198 surfactant.

Copolymer #4 may be described as a silicone-glycol copolymer in which the silicone portion is basically methylsiloxanes and the glycol portions are essentially composed of ethylene oxide and propylene oxide units, said product having a viscosity of 1100 centistokes at 25° C. Such product is readily available on the market identified as Union Carbide L520 surfactant.

Copolymer #5 may be described as a silicone-glycol copolymer in which the silicone portion is basically methylsiloxanes and the glycol portions are essentially composed of ethylene oxide and propylene oxide units, said product having a viscosity of 1300 centistokes at 25° C. Such product is readily available on the market identified as Union Carbide L6202 surfactant.

Copolymer #6 may be described as a silicone-glycol copolymer in which the silicone portion is basically methylsiloxanes and the glycol portions are essentially composed of ethylene oxide and propylene oxide units, said product having a viscosity of 465 centistokes at 25° C. Such product is readily available on the market under the trademark Dow Corning 193 surfactant.

Copolymer #7 may be described as a silicone-glycol copolymer in which the silicone portion is basically methylsiloxanes and the glycol portions are essentially composed of ethylene oxide and propylene oxide units, said product having a viscosity of 300 centistokes at 25° C. Such product is readily available on the market under the trademark Dow Corning 197 surfactant.

Copolymer #8 may be described as a silicone-glycol copolymer in which the silicone portion is basically methylsiloxanes and the glycol portions are essentially composed of ethylene oxide and propylene oxide units, said product having a viscosity of 1000 centistokes at 25° C. Such product is readily available on the market identified as Union Carbide L5540 surfactant.

Polydimethylsiloxane #2 is an especially purified grade of polymethylsiloxane #1 and accordingly is reputed to have the following formula:

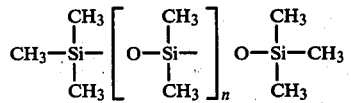

and has a viscosity of 5 centistokes at 25° C. Such product is readily available on the market under the trademark Dow Corning F-11-630 fluid.

Polydimethylsiloxane #3 is reputed to have the following formula:

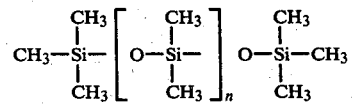

and has a viscosity of 1000 centistokes at 25° C. Such product is readily available on the market under the trademark Dow Corning 200 fluid.

Polymethylsiloxane #4 is reputed to have a formula similar to the following:

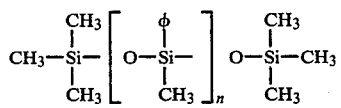

and has a viscosity of 30 centistokes at 25° C. Such product is readily available on the market under the trademark Dow Corning 556 fluid.

What is claimed is:

1. The method for improving cell structure with little or no shrinkage or foam collapse in molded high resilience open celled flexible polyurethane foams prepared by the reaction of an organic polyol having a hydroxyl functionality of at least 2 with an organic polyisocyanate in the presence of a blowing agent, said method comprising incorporating with the reactants three cell modifiers consisting of a polysiloxane-polyoxyalkylene copolymer, a polymethylsiloxane, and a polyether polyol cell modifier containing polyoxyethylene groups in amount of at least about 80 percent by weight of said polyether polyol.

2. The method of claim 1 wherein said blowing agent is water.

3. The method of claim 1 wherein said blowing agent is a low boiling hydrocarbon.

4. The method of claim 1 wherein a polyurethane forming catalyst is also incorporated with said reactants.

5. The method of claim 4 wherein the total amount of said three cell modifiers is about 0.35 to 10 percent by weight of the overall composition including 0.10 to 1.5 percent by weight of said polysiloxane-polyoxyalkylene copolymer, 0.1 to 1.5 percent by weight of said polymethylsiloxane and 0.15 to 9.80 percent by weight of said polyether polyol cell modifier containing at least 80 percent polyoxyethylene groups.

6. The method of claim 5 wherein the amount of said polyisocyanate is sufficient to provide an NCO/OH ratio of 0.9 to 1.3 and the amount of said catalyst is from about 0.7 to 1.5 percent by weight of the overall composition.

7. The method of claim 6 wherein said organic polyol is a polyoxyalkylene polyol having from 2 to 6 carbon atoms in each oxyalkylene group which contains a maximum of 60 percent by weight polyoxyethylene groups and has an average equivalent weight of from about 500 to 3000.

8. An open celled flexible polyurethane foam characterized by fine uniform cell structure with little or no evidence of shrinkage or foam collapse prepared by the reaction of an organic polyol and an organic polyisocyanate in the presence of a blowing agent characterized by the inclusion with the reactants of three cell modifiers which cell modifiers consist of a polysiloxane-polyoxyalkylene copolymer, a polymethylsiloxane and a polyether polyol cell modifier containing polyoxyethylene groups in the amount of at least 80 percent by weight of the polyether polyol.

9. The polyurethane foam of claim 8 wherein said blowing agent is water.

10. The polyurethane foam of claim 8 wherein said blowing agent is low blowing hydrocarbon.

11. The polyurethane foam of claim 8 wherein said organic polyol and said organic polyisocyanate are reacted in the presence of a polyurethane forming catalyst.

12. The polyurethane foam of claim 11 wherein the total amount of said cell modifiers is from about 0.35 to 10 percent by weight of the reactants including 0.1 to 1.5 percent by weight polysiloxane-polyoxyalkylene copolymer, 0.10 to 1.5 percent by weight polymethylsiloxane and 0.15 to 9.80 percent by weight polyether polyol cell modifier which contains at least about 80 percent by weight polyoxyethylene groups.

13. The polyurethane foam of claim 12 wherein said polyurethane foam was prepared by the reaction of polyisocyanate and organic polyol in an amount of polyisocyanate sufficient to provide and NCO/OH ratio of 0.9 to 1.3 and the amount of said catalyst is about 0.7 to 1.5 percent by weight of said reactants.

14. The polyurethane foam of claim 13 wherein said organic polyol is a polyol containing polyoxyalkylene groups, said groups each containing from 2 to 6 carbon atoms, and wherein the amount of polyoxyethylene groups is a maximum of about 60 percent by weight of the organic polyol.

* * * * *